UNITED STATES PATENT OFFICE.

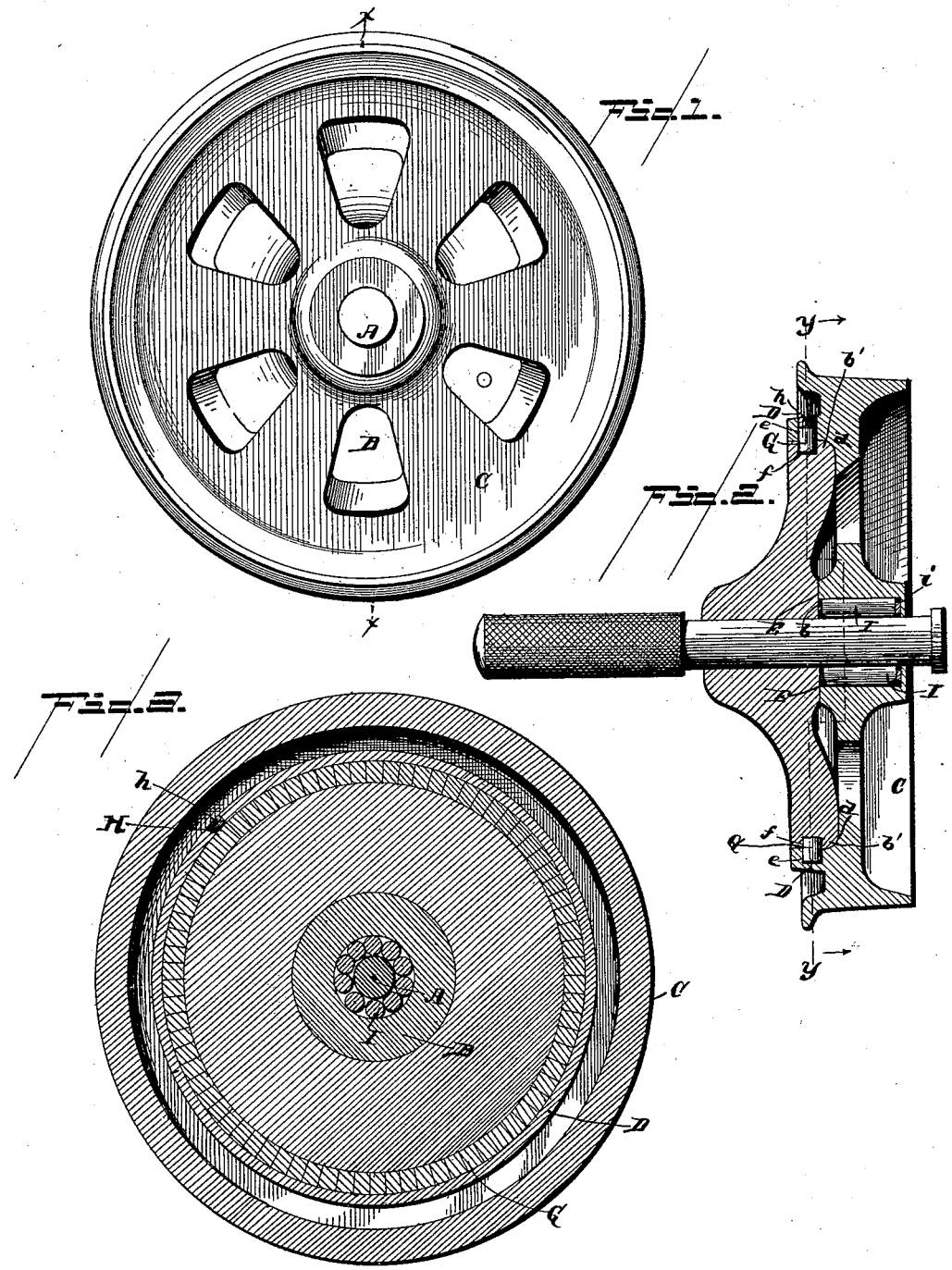

JOHN W. COOPER, OF ATLANTA, GEORGIA.

CAR-WHEEL.

SPECIFICATION forming part of Letters Patent No. 400,307, dated March 26, 1889.

Application filed June 25, 1888. Serial No. 278,072. (No model.)

*To all whom it may concern:*

Be it known that I, JOHN W. COOPER, a citizen of the United States, residing at Atlanta, in the county of Fulton and State of Georgia, have invented certain new and useful Improvements in Car-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to car-wheels, and has for its object the provision of a car-wheel that will not slide when passing around a curve, and which will be free to rotate independent of the axle.

The improvement consists in having the wheel provided with a lateral annular flange which is grooved internally, and in having a center keyed or otherwise secured to the axle and adapted to fit snugly within the said annular flange, and provided with a groove corresponding and coinciding with the groove in the said flange, the wheel and the center being held together by rollers which are fitted in the said coinciding grooves and extending part way in each groove. These rollers relieve the friction between the wheel and the center, and are inserted in the said grooves through a radial opening in the said flange, the said opening being closed by a plug or set-screw to prevent the escape of the rollers. A roller-bearing is interposed between the axle and the wheel to relieve the friction and relieve the center from undue strain.

The improvement further consists in the details of construction, which hereinafter will be more particularly described and claimed, and shown in the drawings, in which—

Figure 1 is a view of the inner side of a wheel embodying my invention; Fig. 2, a cross-section of the wheel on the line X X of Fig. 1, and Fig. 3 a section on the line Y Y of Fig. 2.

The axle A, having the center B secured thereto in the usual manner, supports the wheel C on its outer end. The middle portion, $b$, of the center is flat, and the upper outer corner, $b'$, thereof is rounded to fit a corresponding rounded portion, $d$, of the wheel C. The wheel is provided with the annular flange D, which encircles the center B, and with a central flat portion, E, which bears against the flat portion $b$ of the center. The flange has a groove, $e$, on its inner side, and the center B has a corresponding groove, $f$, which coincides with the groove $e$ when the wheel is placed in position The wheel is held in the center by the rollers G, which are fitted in the grooves $e$ and $f$ and extend part way into each groove, the rollers being let into the grooves through a suitable opening, H, preferably located in the flange D, the opening H being closed afterward by the plug $h$. The bore of the wheel is enlarged on its inner end to receive the roller-bearing I, which is held in the said enlargement between the center B and the shoulder $i$.

The wheel and center revolve together with the axle under ordinary conditions; but when the car is passing around a curve and the wheels at the ends of an axle have unequal distances to traverse the wheels can rotate independent of the axle and centers and accommodate themselves to the varying distances, and obviate any sliding motion on the part of either wheel which would produce an uneven wear and flatten the wheel, besides increasing the wear on the rail and adding to the draft of the engine.

Having thus described my invention, what I claim, and desire to secure by Letters Patent, is—

1. The combination, with the axle and the center having a groove in its periphery, of the wheel having a portion encircling the center and having a groove which coincides with the groove in the said center, and the rollers let into the grooves through a suitably-located opening and locking the wheel to the center, substantially as and for the purpose described.

2. The combination, with the axle and the center having a groove in its edge, of the wheel having an annular flange which encircles the center and having a groove on its inner side coinciding with the groove in the center, and having an opening extending from the groove, and the rollers let into the said grooves through the said opening, substantially as and for the purpose described.

3. The combination, with the axle and the center having its outer corner rounded, of the wheel having a portion encircling the center, and having a corresponding rounded portion to fit the rounded corner of the center, and rollers confined in coinciding grooves in the center and the wheel, substantially as and for the purpose described.

4. The herein shown and described car-wheel, composed of the axle having the center B secured thereto, the wheel having an annular flange which encircles the center, the rollers fitted in coinciding grooves in the flange and the edge of the center, being let into the grooves through an opening in the flange, which opening is closed by a plug, and the roller-bearing fitted in an enlarged portion of the bore and held therein between the center and a shoulder in the said bore, substantially as specified, for the purpose described.

In testimony whereof I affix my signature in presence of two witnesses.

JOHN W. COOPER.

Witnesses:
JAS. B. ROGERS,
GERMANUS KOHL.